(12) United States Patent
Bordui

(10) Patent No.: US 7,068,739 B1
(45) Date of Patent: Jun. 27, 2006

(54) METHOD AND SYSTEM FOR PROVIDING A BINARY DEMODULATOR

(75) Inventor: David Bordui, Lake Mary, FL (US)

(73) Assignee: Cypress Semiconductor Corp., San Jose, CA (US)

( * ) Notice: Subject to any disclaimer, the term of this patent is extended or adjusted under 35 U.S.C. 154(b) by 739 days.

(21) Appl. No.: 10/113,107

(22) Filed: Mar. 29, 2002

(51) Int. Cl.
*H03D 3/00* (2006.01)
*H04L 27/14* (2006.01)

(52) U.S. Cl. ...................... 375/334; 329/300
(58) Field of Classification Search ................ 375/316, 375/329, 80, 324, 334, 340; 370/76, 485; 329/300, 315
See application file for complete search history.

(56) References Cited

U.S. PATENT DOCUMENTS

| | | | | |
|---|---|---|---|---|
| 3,387,220 A | * | 6/1968 | Lender | 329/300 |
| 4,061,978 A | * | 12/1977 | Motley et al. | 375/232 |
| 4,547,737 A | * | 10/1985 | Gibson | 329/343 |
| 5,333,150 A | * | 7/1994 | Ketterling | 375/324 |
| 2002/0059312 A1 | * | 5/2002 | Ishii | 707/200 |
| 2002/0094794 A1 | * | 7/2002 | Manku et al. | 455/189.1 |
| 2003/0156603 A1 | * | 8/2003 | Rakib et al. | 370/485 |

* cited by examiner

Primary Examiner—Betsy L. Deppe

(57) ABSTRACT

One embodiment of the present invention enables a low performance and low cost microprocessor (or microcontroller) to perform binary demodulation of analog communication signals. Within the present embodiment, three techniques may be utilized to enable this functionality. For example, an analog-to-digital converter sampling rate technique is utilized with an incoming modulated analog communication signal. This sampling rate technique is able to eliminate the need for any reference sine and/or cosine waves during the demodulation process. Next, utilizing sample values produced by the sampling rate technique, a continuous-time sum of products calculation is performed by a central processing unit (CPU) of the microprocessor or microcontroller. The results of the continuous-time calculation then enables the present embodiment to demodulate the binary modulated analog signal. An optional digital low pass filter may also be implemented in order to eliminate situations where a false detection of frequency may happen.

23 Claims, 6 Drawing Sheets

METHOD AND SYSTEM FOR PROVIDING A BINARY DEMODULATOR

TECHNICAL FIELD

The present invention generally relates to the field of demodulation. More particularly, the present invention relates to the field of decoding binary-modulated analog signals.

BACKGROUND ART

Many types of techniques are utilized in order to condition and transmit digital data over various analog mediums, such as through the air in the case of Radio Frequency (RF) communications, or over wire in the case of telephone network communications. Typically, most schemes involve the modification of some base, analog "carrier" waveform.

In the case of digital data communications, the raw digital data stream can be used directly in order to cause frequency changes in the carrier frequency itself. Since the digital data has only two possible states, 0 and 1, this represents what is referred to as "binary modulation." It is appreciated that this type of modulation is frequently used in low speed data communications. The general term for this type of data transmission is Frequency Shift Keying (FSK).

It is understood that FSK Modulation involves shifting the frequency of an analog carrier sine wave above, and below, the frequency of the carrier signal itself. The specific frequency of the carrier, as well as the amount of +/− frequency shift, can be defined as desired, or chosen to be in compliance with existing specifications for FSK communications.

Once a digital data stream has been encoded, and a resulting modulated analog waveform has been composed, the analog signal is then transmitted over a communication medium. At the other end of the communications link is a receiving device whose responsibility is to demodulate the incoming analog signal and re-create the original digital data stream.

Over the years, many schemes have been employed to perform the binary-demodulation function. The techniques currently in use fall into one of two general categories: Analog Domain Processing or Digital Domain Processing.

The following has to do with Analog Domain Processing. Specifically, performing demodulation in the Analog Domain typically involves the use of two analog bandpass filters. These filters have their pass-band carefully selected and controlled in order to allow only one of the two possible frequencies to pass. Another circuit that follows the bandpass filter stages makes a determination as to which of the two filters has the highest output. Based on this determination, the decision circuit presents a binary "1" or "0" to the input of yet another circuit whose function is to re-frame the individual data bits into digital words. This re-framing function operates over a predefined set of timing parameters.

While this technique certainly does work, there are disadvantages associated with it. For example, it does not lend itself to implementation using modern, low cost digital microprocessors. The cost of the analog circuitry typically required to perform the demodulation can far exceed the cost of the digital microprocessor whose function is to ultimately operate on the communicated data.

Furthermore, modern appliances and personal electronic devices continue to be reduced in physical size. The additional electronic components usually necessary to implement the analog functions makes this type of demodulator unsuitable for use in these types of applications.

The following has to do with Digital Domain Processing. Most recently, a new type of microprocessor, known as a Digital Signal Processor (DSP), has begun to replace the functionality of certain analog circuits. A DSP has the ability to perform a large number of mathematical computations very quickly. This is due to the architecture of the device itself. By adding this ability to a digital microprocessor, it becomes possible to perform the filtering, decision, and re-framing functions on a single device.

While DSPs have proven to be valuable in demodulator applications, as well as digital communications in general, there are disadvantages associated with them. For example, DSPs are relatively high cost components. In many communication systems, the high component cost can be tolerated due to the very high level of performance, and subsequent data transfer rates that can be achieved. Comparable data transfer rates using analog circuitry would carry a much higher cost, thereby making the DSP an attractive alternative.

However, there is a point where the higher cost of the DSP, or the cost and complexity of Analog Domain processing, is uneconomical for certain end products. This situation is occurring more frequently due to the fact that many low cost consumer products are now being enabled for digital communications of some type.

SUMMARY OF THE INVENTION

Accordingly, a need exists for a method and system for enabling a low performance and low cost microprocessor to perform binary-demodulation on a modulated analog signal. The present invention provides a method and system which accomplishes the above mentioned need.

Specifically, one embodiment of the present invention enables a low performance and low cost microprocessor (or microcontroller) to perform binary demodulation of analog communication signals. Within the present embodiment, three techniques may be utilized to enable this functionality. For example, an analog-to-digital converter sampling rate technique is utilized with an incoming modulated analog communication signal. This sampling rate technique is able to eliminate the need for any reference sine and/or cosine waves during the demodulation process. Next, utilizing sample values produced by the sampling rate technique, a continuous-time sum of products calculation is performed by a central processing unit (CPU) of the microprocessor or microcontroller. The results of the continuous-time calculation then enables the present embodiment to demodulate the binary modulated analog signal. An optional digital low pass filter may also be implemented in order to eliminate situations where a false detection of frequency may happen.

In another embodiment, the present invention provides a method for demodulating a modulated analog signal without utilizing a reference waveform. The method includes receiving the modulated analog signal comprising a carrier frequency. Furthermore, the method includes sampling the modulated analog signal at a rate substantially equal to a multiple of the carrier frequency producing sample values. Additionally, the method includes utilizing a plurality of sample values of the sample values to demodulate the modulated analog signal without utilizing the reference waveform.

In still another embodiment, the present invention includes a system for demodulating a modulated analog signal without utilizing a reference waveform. The system includes an analog-to-digital converter for receiving and sampling the modulated analog signal. It is understood that the modulated analog signal comprises a carrier frequency. Additionally, the analog-to-digital converter is for sampling the modulated analog signal at a rate substantially equal to a multiple of the carrier frequency producing sample values. The system also includes a processor coupled to the analog-to-digital converter to receive the sample values. The processor is also for utilizing a plurality of sample values of the sample values to demodulate the modulated analog signal without utilizing the reference waveform.

In yet another embodiment, the present invention includes a computer-usable medium having computer-readable code embodied therein for causing a computing device to perform: receiving a modulated analog signal comprising a carrier frequency; sampling the modulated analog signal at a rate substantially equal to a multiple of the carrier frequency producing sample values; and utilizing a plurality of sample values of the sample values to demodulate the modulated analog signal without utilizing a reference waveform.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
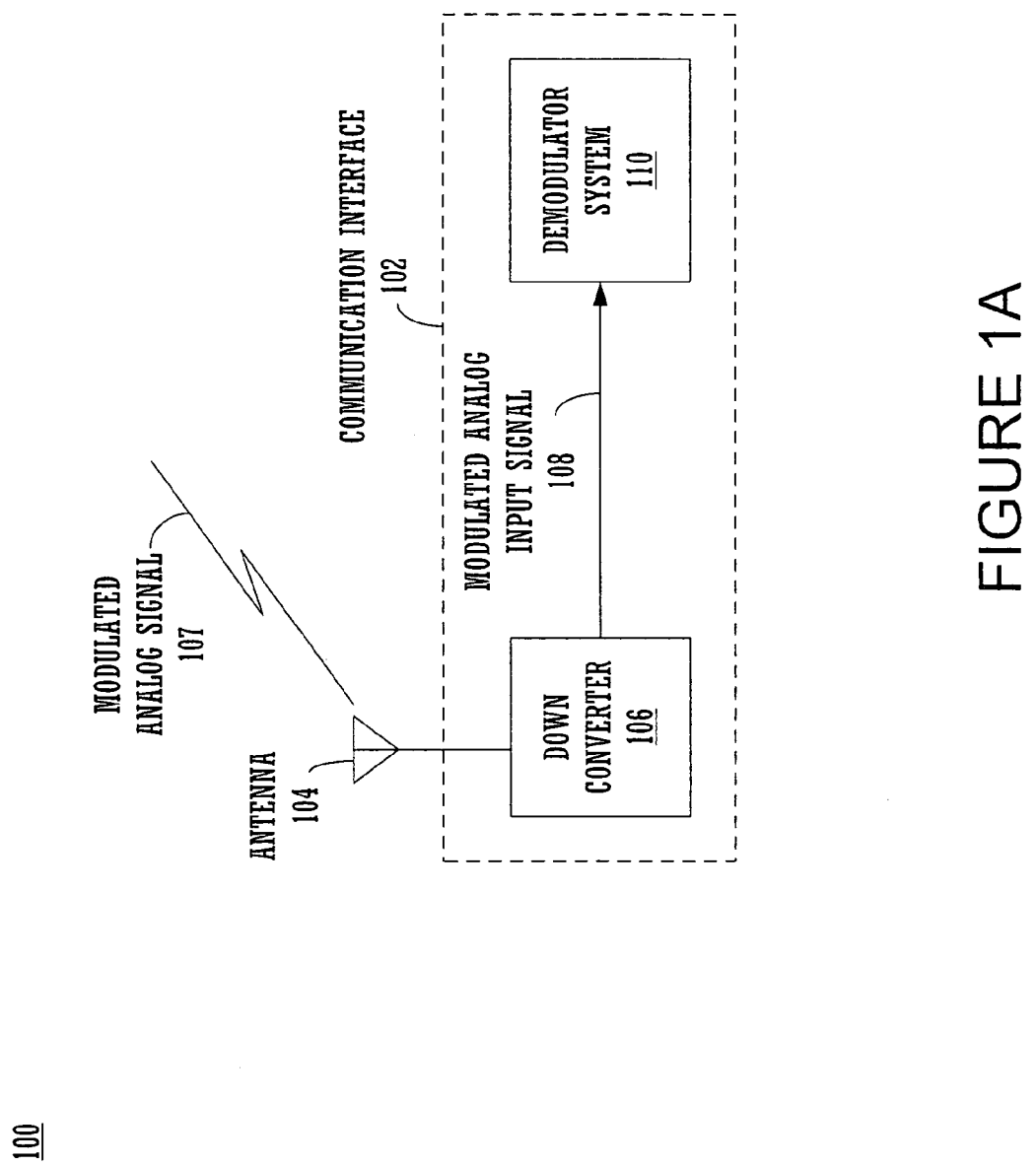
FIG. 1A is a block diagram of an exemplary network and communication interface that may be utilized in accordance with an embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "providing" or "determining" or "sampling" or "activating" or "controlling" or "transmitting" or "receiving" or "recognizing" or "generating" or "utilizing" or "storing" or the like, refer to the action and processes of a computing system, or similar electronic computing device, that manipulates and transforms data. The data is represented as physical (electronic) quantities within the computing system's registers and memories and is transformed into other data similarly represented as physical quantities within the computing system memories or registers or other such information storage, transmission, or display devices.

Exemplary Hardware and Operations in Accordance With the Present Invention

FIG. 1A is a block diagram of an exemplary network 100 and communication interface 102 that may be utilized in accordance with an embodiment of the present invention. It should be appreciated that communication interface 102 may be implemented as part of a wide variety of devices (e.g., computer system, computing device, personal digital assistant, among many others) to enable wireless communication. Within the following discussions of the present invention, certain processes and steps are discussed that are realized, in one embodiment, as a series of instructions (e.g., software program) that reside within computer readable memory units of communication interface 102 and executed by a processor(s) of interface 102. When executed, the instructions cause communication interface 102 to perform specific actions and exhibit specific behavior which is described in detail herein.

The communication interface 102 is capable of wirelessly receiving modulated analog communication signals (e.g., 107) and demodulating them in order to re-create the original digital data stream that was encoded into them. Within the present embodiment, the communication interface 102 may include any wireless communication technologies. For example, the communication interface 102 may be a wireless serial communication port, a Radio Frequency (RF) communication port, or a wireless interface to the Internet, among others.

Specifically, the communication interface 102 of FIG. 1A includes an antenna 104 for receiving a modulated analog communication signal 107 transmitted over the medium (e.g., air) by some other communication device (not shown). The antenna 104 transfers the received modulated analog communication signal 107 to a down converter circuit 106. The down converter circuit 106 then down converts the frequency of the modulated analog communication signal 107 to a range that may be more easily handled by a demodulator system 110 resulting in a modulated analog input signal 108. The down converter 106 then outputs the modulated analog input signal 108 to the demodulator system 110 where it will subsequently be demodulated. It is appreciated that the demodulator system 110 demodulates the modulated analog input signal 108 to re-create the original digital data stream that was encoded into it. A demodulation process in accordance with an embodiment of the present invention that may be performed by the demodulator system 110 is described in detail herein. Once the demodulator system 110 has retrieved the original digital data stream from the modulated analog input signal 108, it is then output (not shown) for use by other circuitry and/or devices, or operated upon directly as is the case with a self-contained microprocessor or microcontroller.

Within the present embodiment, the down converter 106 is coupled to receive modulated analog signals 107 from the antenna 104. Additionally, the demodulator system 110 is coupled to receive modulated analog input signals 108 from the down converter 106. Furthermore, the demodulator system 110 may be coupled to output any demodulated digital data streams (not shown) to other circuitry and/or devices. It is understood that the present embodiment is well suited not to include the down converter 106 as part of communication interface 102 if the frequency of the modulated analog communication signal 107 is within a frequency range that can be handled by the demodulator system 110. In this situation, the demodulator system 110 would be coupled to receive the modulated analog communication signal 107 from the antenna 104.

It should be understood that the modulated analog signal 107 and the modulated analog input signal 108 of FIG. 1A may each include, but are not limited to, Frequency Shift Keying (FSK) data communications.

Figure 1B:
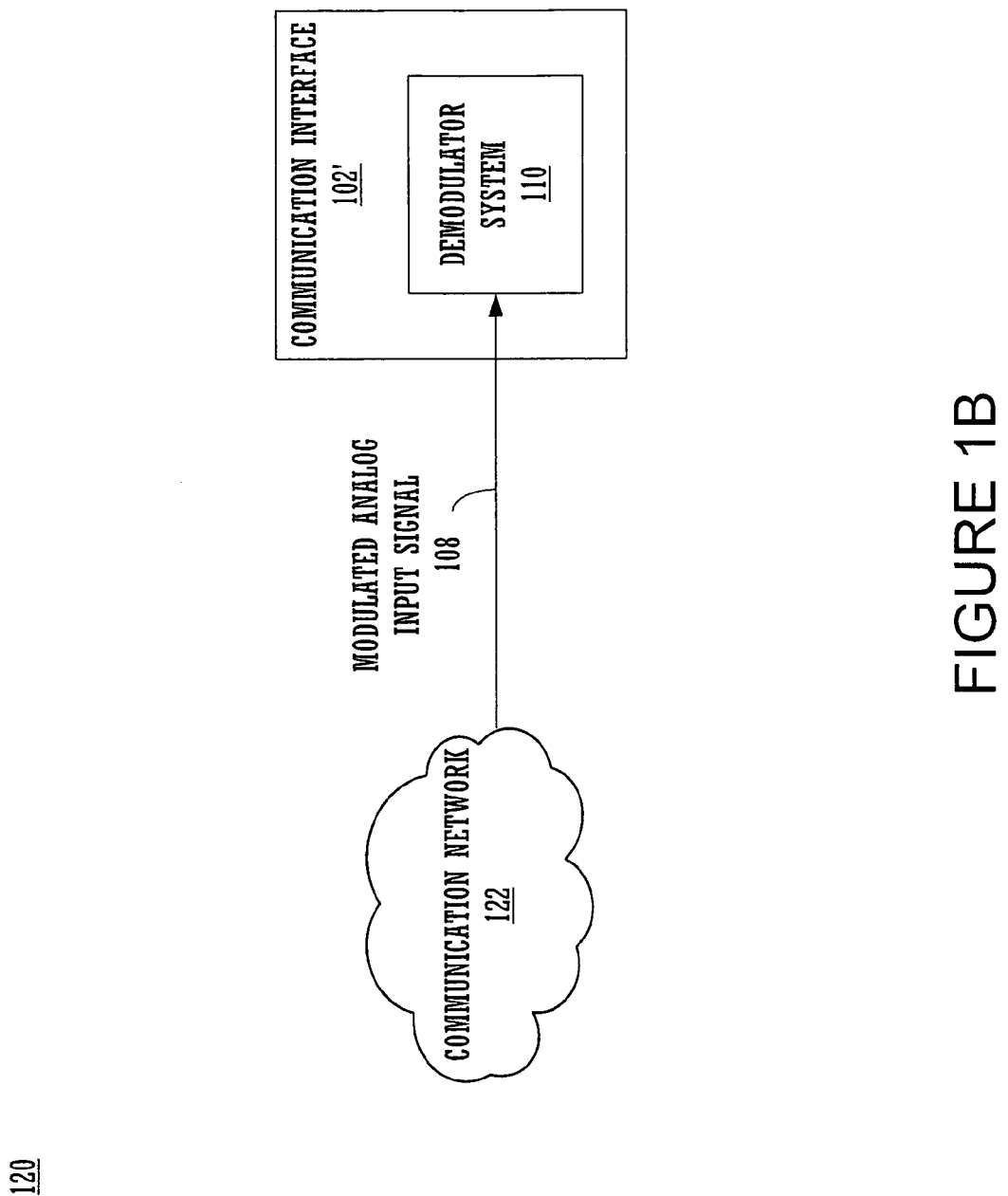
FIG. 1B is a block diagram of an exemplary network and communication interface that may be utilized in accordance with another embodiment of the present invention.

FIG. 1B is a block diagram of an exemplary network 120 and communication interface 102' that may be utilized in accordance with an embodiment of the present invention. It is appreciated that communication interface 102' may be implemented as part of a wide variety of devices (e.g., computer system, computing device, personal digital assistant, among many others) to enable wired communication. Within the following discussions of the present invention, certain processes and steps are discussed that are realized, in one embodiment, as a series of instructions (e.g., software program) that reside within computer readable memory units of communication interface 102' and executed by a processor(s) of interface 102'. When executed, the instructions cause communication interface 102' to perform specific actions and exhibit specific behavior which is described in detail herein.

Specifically, communication interface 102' is capable of receiving modulated analog communication input signals (e.g., 108) via wired technology and demodulating them in order to re-create the original digital data stream that was encoded into them. Within the present embodiment, the communication interface 102' may include any wired communication technologies. For example, the communication interface 102' may be a wired serial communication port, an Ethernet adapter, a Universal Serial Bus (USB), FireWire® (IEEE 1394) interface, a parallel port, a small computer system interface (SCSI) bus interface, a broadband interface, or a wired interface to the Internet, among others.

Within FIG. 1B, the communication interface 102' is coupled to receive a modulated analog input signal 108 via a communication network 122 which was transmitted by some other communication device (not shown). Specifically, the demodulator system 110 (of the communication interface 102') is coupled to receive the modulated analog input signal 108 via the communication network 122. Subsequently, the demodulator system 110 demodulates the modulated analog input signal 108 in order retrieve the original digital data stream that was encoded into it. A demodulation process in accordance with an embodiment of the present invention that may be performed by the demodulator system 110 is described in detail herein. Once the demodulator system 110 has retrieved the original digital data stream from the modulated analog input signal 108, it is then output (not shown) for use by other circuitry and/or devices, or operated upon directly as is the case with a self-contained microprocessor or microcontroller.

The communication network 122 of the present embodiment is well suited to be implemented in a wide variety of ways in accordance with the present invention. For example, communication network 122 may be implemented to include, but is not limited to, the Internet, a telecommunication network, a cable network, a local area network (LAN), a metropolitan area network (MAN), or a wide area network (WAN), among others. Additionally, the communication network 122 may be implemented to include two or more of the previously listed network configurations. The demodulator system 110 is communicatively coupled to communication network 122. Furthermore, the demodulator system 110 may be coupled to output any demodulated digital data streams (not shown) to other circuitry and/or devices. Additionally, it should be understood that the modulated analog input signal 108 may include, but is not limited to, Frequency Shift Keying (FSK) data communications.

Figure 2:
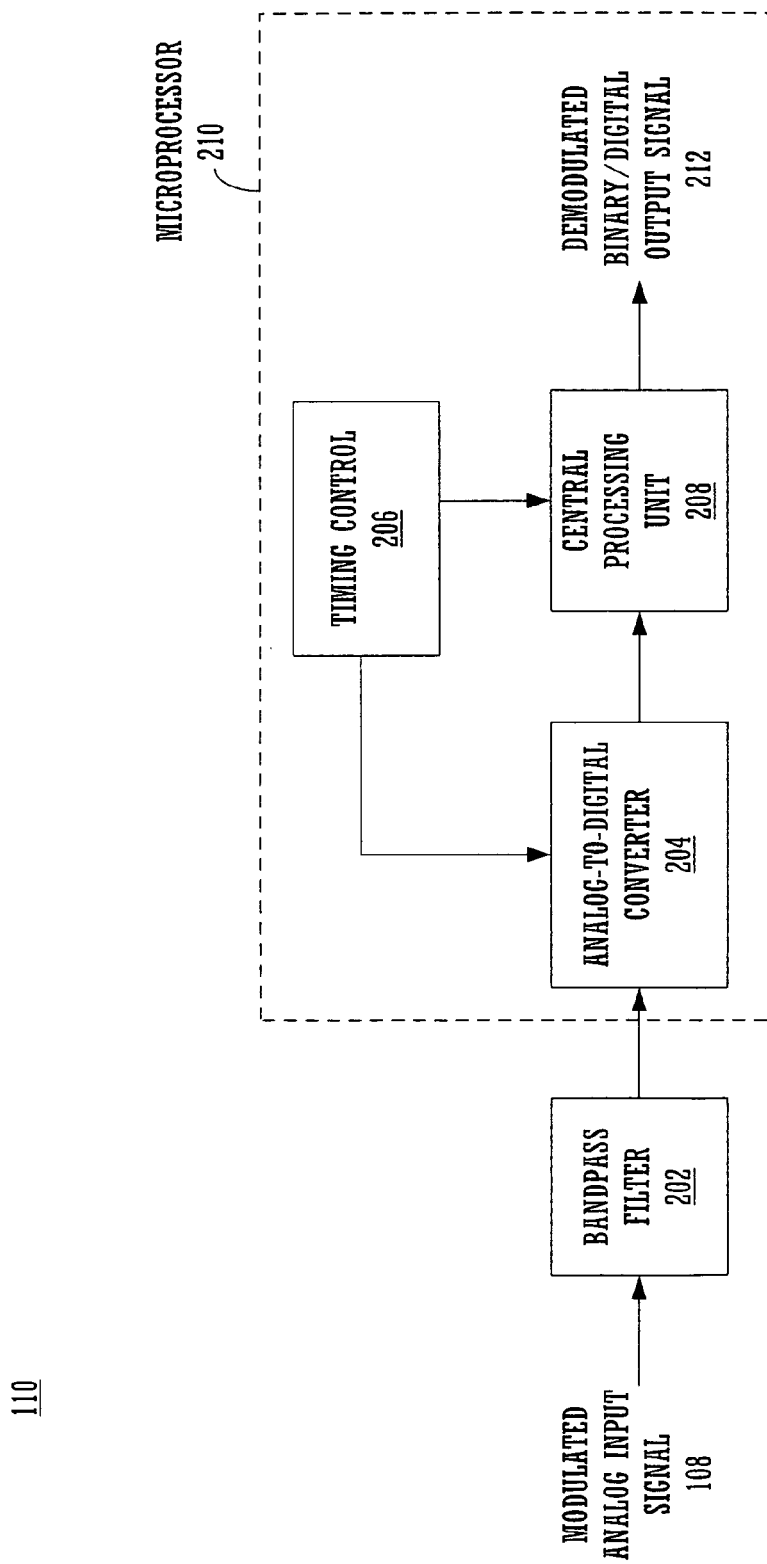
FIG. 2 is a block diagram of an exemplary demodulator system in accordance with an embodiment of the present invention.

FIG. 2 is a block diagram of an exemplary demodulator system (e.g., 110) in accordance with an embodiment of the present invention. Within the following discussions of the present embodiment, certain processes and steps are discussed that are realized, in one embodiment, as a series of instructions (e.g., software program) that reside within computer readable memory units accessible by a microprocessor 210 and executed by a central processing unit (CPU) 208 of microprocessor 210. When executed, the instructions cause microprocessor 210 to perform specific actions and exhibit specific behavior which is described in detail herein.

It is appreciated that the present embodiment enables a low performance and low cost microprocessor (e.g., 210) to perform binary demodulation of analog communication signals (e.g., 108). For example, demodulator system 110 is able to perform, but is not limited to, non-coherent quadrature demodulation of full duplex FSK modulated signals. Within the present embodiment, three techniques may be utilized to enable this desirable functionality. For example, an analog-to-digital converter sampling rate technique is utilized with an incoming modulated analog communication signal (e.g., 108). This sampling rate technique is able to eliminate the need for any reference sine and/or cosine waves during the demodulation process. Next, utilizing sample values produced by the sampling rate technique, a continuous-time sum of products calculation is performed by CPU 208 of the microprocessor 210. The results of the continuous-time calculation then enables the present embodiment to demodulate the binary modulated analog signal (e.g., 108). An optional digital low pass filter may also be implemented in order to eliminate situations where a false detection of frequency may happen. As such, the microprocessor 210 produces a demodulated binary/digital output signal (e.g., 212) which is a re-creation of the original digital data stream that was encoded into the modulated analog input signal (e.g., 108). It should be understood that microprocessor 210 of the present embodiment is well suited to be implemented as a microcontroller.

The demodulator system 110 of FIG. 2 includes a bandpass filter 202 which is coupled to receive the modulated analog input signal 108. The bandpass filter 202 allows signals of the modulated analog input signal 108 that are within a particular frequency range to pass through while it blocks signals that are above or below the particular frequency range. The demodulator system 110 also includes the microprocessor 210 which contains different sub-components. For example, the microprocessor 210 includes an analog-to-digital converter 204 which is coupled to receive the modulated analog input signal 108 output from the bandpass filter 202. It should be understood that the analog-to-digital converter 204 does not have to be synchronized with the modulated analog input signal 108 which is commonly referred to as "non-coherent." Additionally, the microprocessor 210 includes the CPU 208 that is coupled to receive samples of the modulated analog input signal 108 output by the analog-to-digital converter 204. Furthermore, the microprocessor 210 includes a timing control circuit 206 which is coupled to both the analog-to-digital converter 204 and the CPU 208. It is appreciated that the timing control circuit provides timing utilized to synchronize the operations of the analog-to-digital converter 204 and the CPU 208. The CPU 208 may then produce a demodulated binary/digital output signal 212 that may be operated upon directly as is the case with a self-contained microprocessor 210 (or microcontroller). Alternatively, the CPU 208 may be coupled to output the demodulated binary/digital output signal 212 to other circuitry and/or devices (not shown) that are not part of microprocessor 210.

It should be appreciated that one of the ways the present embodiment reduces computational overhead for microprocessor 210 involves eliminating the need for utilizing any reference sine and/or cosine waves in the demodulation process. Therefore, this removes the necessity of having to either generate, or include additional circuitry to generate as many as four reference signals.

One of the reasons for eliminating these reference waveforms is derived from the 90 degree phase relationship of the sine and cosine functions. It is appreciated that a cosine wave is identical to a sine wave except that there is a 90 degree phase shift between the two waves. Considering this relationship, and considering that the desired result is to detect a frequency change above or below a fixed "carrier" frequency, the present embodiment utilizes an analog-to-digital converter (ADC) 204 to sample the incoming modulated analog signal 108 at substantially four times the frequency of its carrier frequency. As such, a 90 degree phase shift relationship may be extracted directly from the incoming modulated analog signal 108 itself.

It should be understood that the sampling rate of the analog-to-digital converter 204 may be any multiple which yields a sample interval of substantially 90 degrees or some odd whole number multiple of substantially 90 degrees. For example, it may be possible to sample the incoming analog signal 108 at zero degrees and 270 degrees (e.g., 90*3) and achieve similar results.

With the present embodiment of FIG. 2, it is generally desirable to have the microprocessor 210 able to operate on a single cycle of the incoming modulated analog signal 108. This being the case, it is desirable to take more than one sample per cycle. In this situation, it is pointed out that a sampling rate of substantially four times the carrier frequency provides desirable results within the present embodiment. This meets the criteria of a sample interval of substantially 90 degrees and also provides four samples per cycle from which the CPU 208 may perform the relative frequency determination and demodulation.

It should be pointed out that since an analog-to-digital converter (e.g., 204) is a typical part of any digital microprocessor (e.g., 210) operating on analog signals, it does not represent any additional circuitry that would not be expected in a mixed signal design. Furthermore, many microprocessors contain integrated analog-to-digital converters (e.g., 204). It is understood that controlling and setting the sampling rate of the analog-to-digital converter likewise does not usually present very much, if any, ongoing computational overhead for a microprocessor (e.g., 210).

While this analog-to-digital converter sampling technique of the present embodiment does not yield the actual sine and cosine value of the incoming analog signal 108, it nevertheless contains the 90 degree phase shift sample information. Also, since the analog-to-digital converter sampling rate may be at four times the frequency of the carrier frequency of incoming analog signal 108, it is possible to obtain enough information about the incoming signal 108 to enable the CPU 208 of FIG. 2 to perform calculations. This functionality is based on the accepted theory known as Nyquist Sampling Theory, which states that to discriminate analog signals, at least two points of a single period of the signal has to be known.

As part of implementing of the demodulator functionality of the present embodiment, it is desirable to limit the number of calculations performed by the CPU 208 as well as the amount of intermediate data that is stored. As such, the present embodiment utilizes one or more continuous-time functions. It is understood that these continuous-time functions have the ability to operate on a continuous stream of data as opposed to storing large amounts of data and subsequently operating on that data as a discrete group.

In conjunction with using the analog-to-digital converter sampling technique of the present embodiment, a continuous-time function may use the following operators with the following relationship:

X(n): 0 degree phase shift; Current sample of the ADC 204

X(n−1): substantially−90 degree phase shift

X(n−2): substantially−180 degree phase shift

X(n−3): substantially−270 degree phase shift

Within the present embodiment, as a new sample is taken of the incoming modulated analog signal 108 by the analog-to-digital converter 204, each previous sample is shifted into a storage location which represents a substantially−90 degree location relative to where it was prior to the new sample being taken. In this way, the four storage locations contain four samples that maintain the substantially–90 degree phase relationship to one another.

One of the things that the CPU 208 of FIG. 2 may do in this procedure is to multiply the current sample of the analog-to-digital converter 204 (e.g., zero degree phase shift) by the previous sample (e.g., substantially–90 degree phase shift). For example, this multiplication W(n) may be expressed by the following relationship:

$$W(n)=X(n)*X(n-1)$$

As this W(n) is determined by the CPU 208 on a continuous basis, it has the effect of doubling the frequency of the incoming modulated analog signal 108. The result of this computation W(n) may be stored in a memory location by the CPU 208 and will be used in subsequent calculations. It should be appreciated that while the frequency is doubled with the determination of W(n), the polarity (or sign) of the signal remains intact, both positive and negative. Also, a slight phase shift is introduced into the sample set due to the deviation of the incoming analog signal 108 from the carrier signal, and its place in time relative to the fixed sampling rate. It is understood that this is due to the fact that the slight difference in the frequency of the incoming analog signal 108 relative to the fixed carrier frequency, from which our sampling rate of the analog-to-digital converter 204 was derived, causes a shift of the point where the polarity (or sign) of the samples change from positive to negative.

Figure 3:
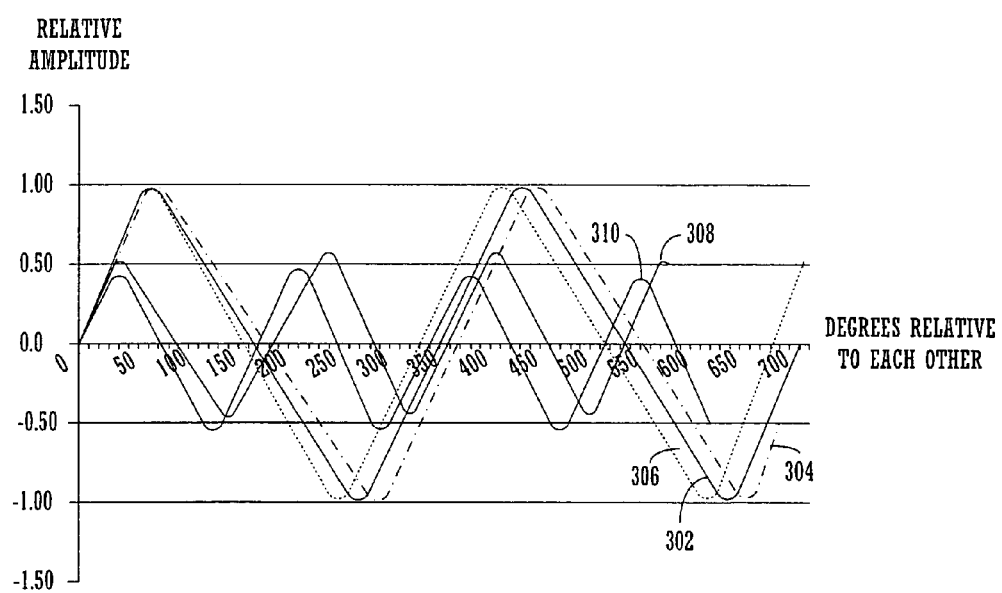
FIG. 3 is a graph illustrating exemplary results produced from a calculation in accordance with an embodiment of the present invention.

FIG. 3 is a graph 300 illustrating exemplary results produced from calculation W(n) in accordance with an embodiment of the present invention. Specifically, graph 300 shows both exemplary high product sine wave 308 and low product sine wave 310 produced by the W(n) calculation. Furthermore, graph 300 shows an exemplary carrier input sine wave 302 of the incoming modulated analog signal 108. Additionally, graph 300 shows an exemplary input sine wave 306 having a frequency higher than carrier sine wave 302 along with an exemplary input sine wave 304 having a frequency lower than carrier sine wave 302. It is understood that input sine waves 304 and 306 are typical examples of frequency deviation that may be commonly used in FSK communication. It is noted that the Y axis of graph 300 represents the relative amplitude of the waveforms (e.g., 302, 304, 306, 308 and 310) while the X axis represents the degrees relative to each waveform (e.g., 302, 304, 306, 308 and 310).

Next, the result W(n) of the multiplication may be added by the CPU 208 to the result of the same multiplication that took place during the prior sample interval of the analog-to-digital converter 204, and so on. For example, this determination Y(n) may be expressed by the following relationship:

$$Y(n)=W(n)+W(n-1)$$

or $$Y(n)=(X(n)*X(n-1))+(X(n-1)*X(n-2))$$

where W(n–1) is equal to the result of the previously performed multiplication. It should be appreciated that since the Y(n) computation may be performed by CPU 208 at fixed intervals relative to the carrier frequency, the resulting Y(n) may yield all positive or all negative results depending on whether the incoming data frequency is higher or lower than the fixed carrier frequency of the incoming modulated analog signal 108.

It should be understood that once the CPU 208 has determined the result of Y(n), it may be utilized by CPU 208 to determine whether that portion of the modulated analog signal 108 is equivalent to a binary one or zero. For example, if Y(n) is equal to a negative number, the CPU 208 may determine that the frequency is higher than the carrier frequency and may be interpreted as a binary one. However, if Y(n) is equal to a positive number, the CPU 208 may determine that the frequency is lower than the carrier frequency and may be interpreted as a binary zero. In an alternative embodiment utilizing "inverted" logic, if Y(n) is equal to a negative number, the CPU 208 may determine that the frequency is higher than the carrier frequency and may be interpreted as a binary zero. Additionally, if Y(n) is equal to a positive number, the CPU 208 may determine that the frequency is lower than the carrier frequency and may be interpreted as a binary one.

During utilization of relationship Y(n) by CPU 208, it should be understood that there is a point where the value of Y(n) from both the higher and lower frequencies may come very close to zero. Consequently, this could cause a false detection of frequency change which subsequently results in an error contained with the demodulated output signal 212 of the CPU 208. As such, an optional digital low pass filter may also be implemented in order to eliminate these situations where a false detection of frequency may happen.

For example, by introducing another term to the Y(n) relationship of the present embodiment, it is possible to create the functionality of a digital low pass filter. By using filter coefficients set to one, it is appreciated that the filter calculation performed by CPU 208 may be simplified because the multiplication by the coefficient is effectively eliminated. Within the present embodiment, the additional term added to Y(n) by the CPU 208 may be the result of the Y(n–1) summation which was calculated during the previous sample interval of the analog-to-digital converter 204. For example, this determination Z(n) may be expressed by the following relationship:

$$Z(n)=Y(n)+Y(n-1)$$

or $$Z(n)=W(n)+W(n-1)+W(n-2)+W(n-3)$$

or $$Z(n)=[((X(n)*X(n-1))+(X(n-1)*X(n-2))]+[((X(n-1)*X(n-2))+(X(n-2)*X(n-3))]$$

It is pointed out that the addition of the Y(n–1) term to the Y(n) within the Z(n) relationship effectively moves the values further away from the value of zero and substantially eliminates the situation where a false detection of frequency by the CPU 208 can happen.

It should be appreciated that once the CPU 208 has determined the result of Z(n), it may be utilized by CPU 208 to determine whether that portion of the modulated analog signal 108 is equivalent to a binary one or zero. For example, if Z(n) is equal to a negative number, the CPU 208 may determine that the frequency is higher than the carrier frequency and may be interpreted as a binary one. However, if Z(n) is equal to a positive number, the CPU 208 may determine that the frequency is lower than the carrier frequency and may be interpreted as a binary zero. In an alternative embodiment utilizing "inverted" logic, if Z(n) is equal to a negative number, the CPU 208 may determine that the frequency is higher than the carrier frequency and may be interpreted as a binary zero. Additionally, if Z(n) is equal to a positive number, the CPU 208 may determine that the frequency is lower than the carrier frequency and may be interpreted as a binary one.

Figure 4:
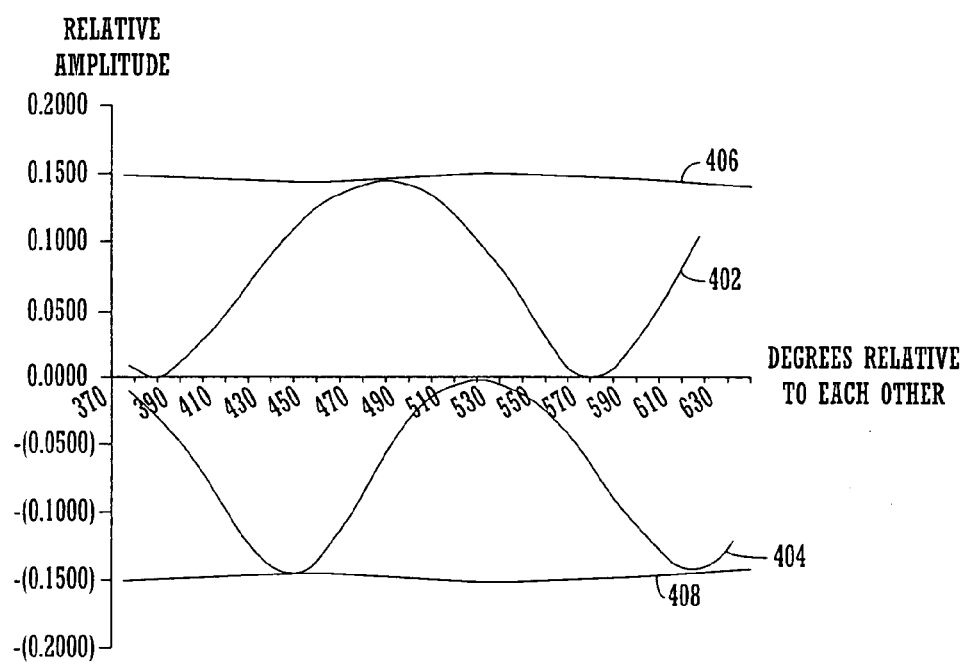
FIG. 4 is a graph illustrating exemplary results produced from calculations in accordance with an embodiment of the present invention.

FIG. 4 is a graph 400 illustrating exemplary results produced from calculations Y(n) and Z(n) in accordance with an embodiment of the present invention. Specifically, graph 400 shows exemplary waveforms 402 and 404 which may be produced by calculation Y(n). It can seen in graph 400 that some points of waveforms 402 and 404 approach very closely the value of zero which may cause false detection of frequency by CPU 208. Additionally, graph 400 shows exemplary waveforms 406 and 408 which may be produced by calculation Z(n) which includes a digital low pass filter. It is seen in graph 400 that waveforms 406 and 408 do not approach the value of zero which is desirable. It is noted that the Y axis of graph 400 represents the relative amplitude of the waveforms (e.g., 402, 404, 406 and 408) while the X axis represents the degrees relative to each waveform (e.g., 402, 404, 406 and 408).

It is appreciated that the calculations and determination presented herein are well within the capabilities of most low performance, low cost microprocessors (e.g., 210) because they are composed of simple multiplication and summation. Furthermore, since these calculations and determination are implemented within the present embodiment as a continuous-time calculation(s), it is not necessary to store large amounts of sample data from the analog-to-digital converter 204, or store many intermediate results.

Within the present embodiment, the sampling technique performed by the analog-to-digital converter 204 in conjunction with the performance of the continuous-time calculation(s) by the CPU 208 effectively demodulate a binary-modulated analog signal 108, such as those utilized in Frequency Shift Keying (FSK) data communications.

Figure 5:
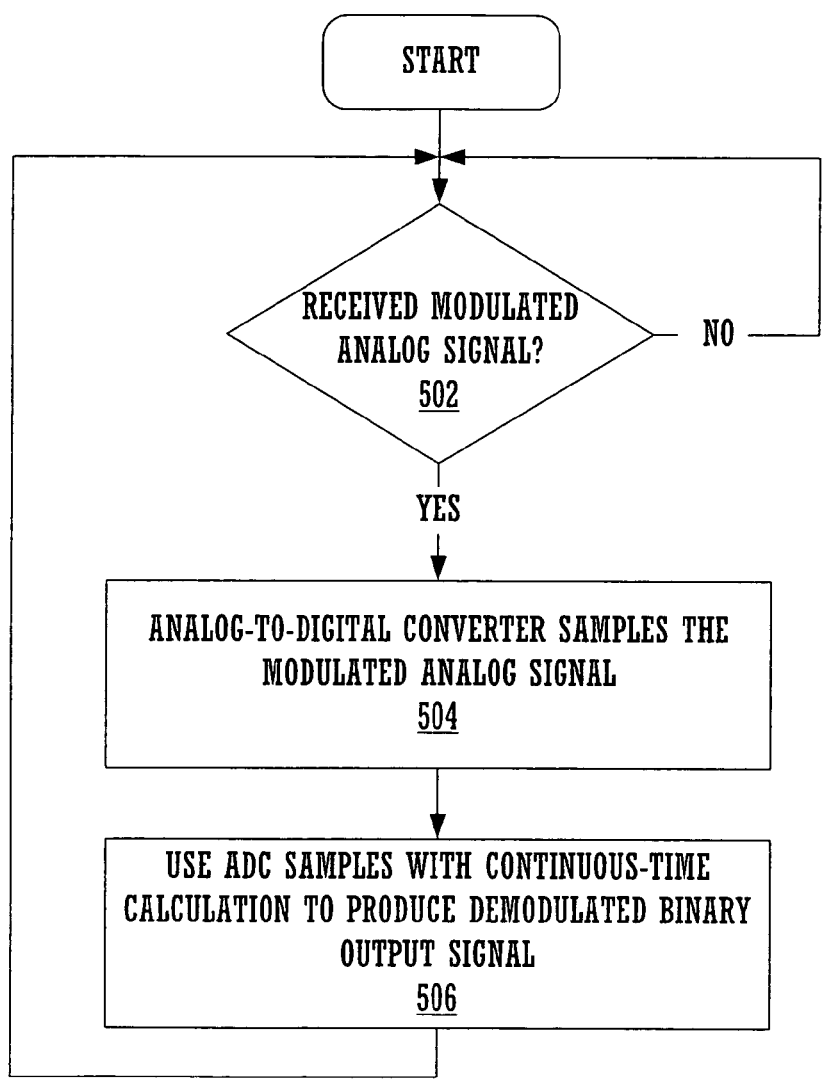
FIG. 5 is a flowchart of steps performed in accordance with one embodiment of the present invention for demodulating a modulated analog signal.

FIG. 5 is a flowchart 500 of steps performed in accordance with one embodiment of the present invention for demodulating a modulated analog signal. Flowchart 500 includes processes of the present invention which, in one embodiment, are carried out by a microprocessor (or microcontroller) and electrical components under the control of computer readable and computer executable instructions. The computer readable and computer executable instructions may reside, for example, in data storage features such as computer usable volatile memory and/or computer usable non-volatile memory. However, the computer readable and computer executable instructions may reside in any type of computer readable medium. Although specific steps are disclosed in flowchart 500, such steps are exemplary. That is, the present invention is well suited to performing various other steps or variations of the steps recited in FIG. 5. Within the present embodiment, it should be appreciated that the steps of flowchart 500 may be performed by software, by hardware or by any combination of software and hardware.

At step 502, the present embodiment determines whether it has received a modulated analog signal (e.g., 108). If the present embodiment determines that it has not received a modulated analog signal at step 502, the present embodiment proceeds to the beginning of step 502. However, if the present embodiment determines that is has received a modulated analog signal at step 502, the present embodiment proceeds to step 504. It is appreciated that the modulated analog signal of step 502 may be implemented in a wide variety of ways such as, but not limited to, Frequency Shift Keying (FSK) or any other binary/digital modulation signal technique.

In step 504 of FIG. 5, the present embodiment causes an analog-to-digital converter (e.g., 204) to sample the received modulated analog signal (e.g., 108). It is understood that step 504 may be implemented in diverse ways in accordance with an embodiment of the present invention. For example, the present embodiment enables an analog-to-digital converter (ADC) to sample the incoming modulated analog signal at four times the frequency of its carrier frequency. It is understood that the sampling rate of the analog-to-digital converter at step 504 may be any multiple which yields a sample interval of substantially 90 degrees or some odd integer multiple of substantially 90 degrees. For example, the analog-to-digital converter may sample the modulated analog signal at zero degrees and 270 degrees (e.g., 90*3). It is appreciated that the sampling at step 504 of the modulated analog signal by the analog-to-digital converter may be performed in any manner similar to that described herein.

At step 506, the present embodiment utilizes the ADC samples produced at step 504 in conjunction with a continuous-time calculation in order to produce a demodulated binary/digital output signal (e.g., 212). It should be understood that the continuous-time calculation of step 506 may be utilized to determine whether a portion of the modulated analog signal is equivalent to a binary one or zero. It is appreciated that the continuous-time calculation of step 506 may be implemented in diverse ways in accordance with an embodiment of the present invention. For example, the continuous-time calculation of step 506 may be represent as:

$$Y(n)=(X(n)*X(n-1))+(X(n-1)*X(n-2))$$

where $Y(n)$, $X(n)$, $X(n-1)$ and $X(n-2)$ are described herein and Y(n) may be analyzed by the present embodiment at step 506 to determine whether a portion of the modulated analog signal is equivalent to a binary one or zero in a manner similar to that described herein. Alternatively, the continuous-time calculation of step 506 may include a low pass filter component. For example, that continuous-time calculation of step 506 may be represent as:

$$Z(n)=[((X(n)*X(n-1))+(X(n-1)*X(n-2)))]+[((X(n-1)*X(n-2))+(X(n-2)*X(n-3)))]$$

where Z(n), X(n), X(n–1), X(n–2), and X(n–3) are described herein and Z(n) may be analyzed by the present embodiment at step 506 to determine whether a portion of the modulated analog signal is equivalent to a binary one or zero in a manner similar to that described herein. Once step 506 is completed, the present embodiment proceeds to the beginning of step 502.

Accordingly, the present invention provides a method and system for enabling a low performance and low cost microprocessor or microcontroller to perform binary-demodulation on a modulated analog signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for demodulating a modulated analog signal without utilizing a reference waveform, said method comprising:
   receiving said modulated analog signal comprising a carrier frequency;
   sampling the received modulated analog signal at a rate substantially equal to a multiple of said carrier frequency producing samples;
   multiplying each of said samples by its previous sample resulting in products;
   adding each of said products to its previous product producing a result; and
   utilizing said result to demodulate said modulated analog signal without utilizing said reference waveform.

2. The method as described in claim 1 wherein said modulated analog signal comprises a Frequency Shift Keying (FSK) modulated signal.

3. The method as described in claim 1 wherein said multiple is four.

4. The method as described in claim 1 wherein said utilizing further comprises utilizing a low pass filter.

5. The method as described in claim 1 wherein said samples are each separated by an interval of substantially 90 degrees.

6. The method as described in claim 1 wherein said samples are each separated by an odd whole number multiple of substantially 90 degrees.

7. The method as described in claim 1 wherein said sampling said modulated analog signal is performed by an analog-to-digital converter.

8. The method as described in claim 1 wherein said utilizing is performed by a microprocessor or a microcontroller.

9. A computer-usable medium having computer-readable code embodied therein for causing a computing device to perform a method comprising:
   receiving a binary modulated analog signal comprising a carrier frequency;
   sampling the received binary modulated analog signal at a rate substantially equal to a multiple of said carrier frequency producing sample values;
   multiplying each of said sample values by its previous sample value resulting in product values;
   adding each of said product values to its previous product value producing a result; and
   utilizing said result to demodulate said binary modulated analog signal without utilizing a reference waveform.

10. The computer-usable medium of claim 9 wherein said binary modulated analog signal comprises a Frequency Shift Keying (FSK) modulated signal.

11. The computer-usable medium of claim 9 wherein said multiple is four.

12. The computer-usable medium of claim 9 wherein said utilizing further comprises utilizing a low pass filter.

13. The computer-usable medium of claim 9 wherein said sample values are each separated by an interval of substantially 90 degrees.

14. The computer-usable medium of claim 9 wherein said sample values are each separated by an odd integer multiple of substantially 90 degrees.

15. The computer-usable medium of claim 9 wherein said sampling is performed by an analog-to-digital converter of said computing device.

16. The computer-usable medium of claim 15 wherein said computing device comprises a microcontroller or a microprocessor that comprises said analog-to-digital converter.

17. A system for demodulating a modulated analog signal without utilizing a reference waveform, said system comprising:
   an analog-to-digital converter for receiving and sampling said modulated analog signal, said modulated analog signal comprises a carrier frequency, said analog-to-digital converter for sampling said modulated analog signal at a rate substantially equal to a multiple of said carrier frequency producing samples; and
   a processor coupled to said analog-to-digital converter for receiving said samples, for multiplying each of said samples by its previous sample resulting in products, for adding each of said products to its previous product producing a result, and for utilizing said result to demodulate said modulated analog signal without utilizing said reference waveform.

18. The system of claim 17 wherein said modulated analog signal comprises a Frequency Shift Keying (FSK) modulated signal.

19. The system of claim 17 wherein said multiple is four.

20. The system of claim 17 wherein said processor utilizes a low pass filter with said result to demodulate said modulated analog signal without utilizing said reference waveform.

21. The system of claim 17 wherein said samples are each separated by an interval of substantially 90 degrees.

22. The system of claim 17 wherein said samples are each separated by an odd whole number multiple of substantially 90 degrees.

23. The system of claim 17 wherein said analog-to-digital converter and said processor are part of a microprocessor or a microcontroller.

* * * * *